United States Patent Office 2,990,159
Patented June 27, 1961

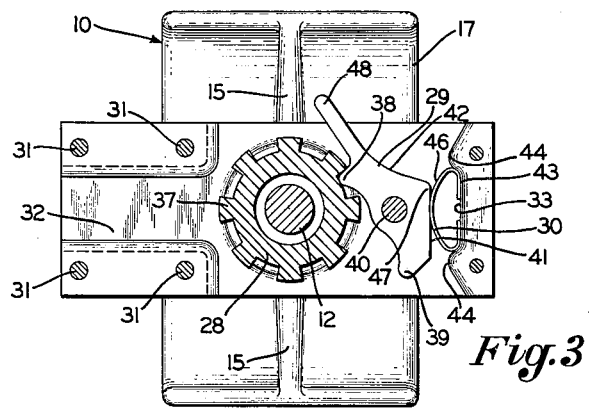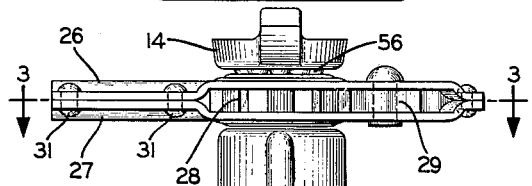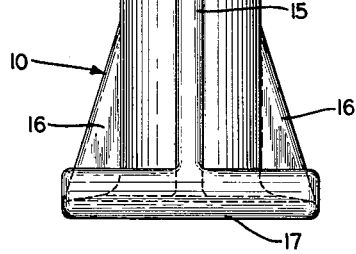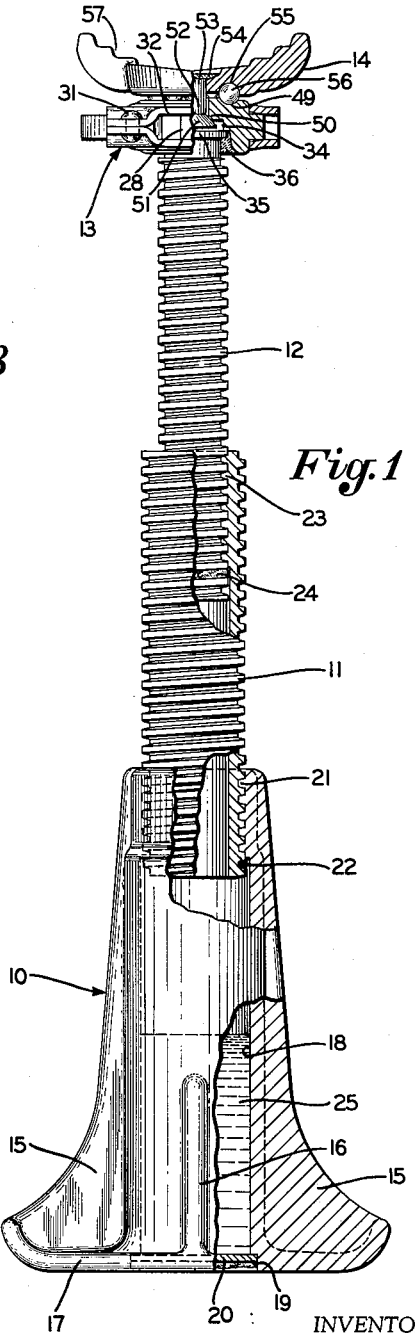

2,990,159
LIFTING JACK CONSTRUCTION
Herbert O. Haferkorn, 126 33rd St., NW., Canton, Ohio
Filed Nov. 21, 1957, Ser. No. 697,869
1 Claim. (Cl. 254—102)

My invention relates generally to improvements in lifting jack construction, and more specifically to screw type lifting jacks used primarily for lifting trucks, as well as for general use around garages and shops. Even more specifically my invention relates to improvements on screw type lifting jacks having a base member with one or more screw members being selectively extendable upwardly from the base member and telescoping with the base member when in a retracted position.

Certain prior constructions of screw type lifting jacks of the general type described have included an internally threaded nut rotatably mounted on the base member and engaged with threads on the outer periphery of a screw member, with this nut being retained against axial movement with reference to the base and screw members. With such a construction, by selectively rotating the nut on the base member and with reference to the screw member, the screw member is extended and retracted as desired.

One major difficulty with such a lifting jack construction is that, since the nut must be mounted on the base member rotatably and must be the sole supporting member for the screw member whether the screw member is in retracted or fully extended position, in order for the screw member to be controlled by the nut, the entire stability of the screw member and particularly when in fully extended position, is dependent on the particular rotatable mounting of the nut in the base member. Thus considerable difficulties have been encountered in maintaining stability for the screw member in fully extended position, since the tolerances required between the nut and base member for maintaining this stability while still maintaining the nut rotatable become prohibitive.

Furthermore these prior constructions have necessarily included a tubular base member in order that the screw member may be telescoped therein when in fully retracted position. Also, to provide a practical construction which may be properly assembled during manufacture, the bottom or foot portion of the base member has usually been provided with an opening therethrough, so that after the screw is assembled with the nut and base member, the proper stops can be applied to the screw member to prevent the complete disassembly of the screw member from the nut during the operation of the jack.

This form of construction, however, has also presented a difficulty in the use of the jack, since it is often necessary to use the jack on soft ground. During such use, dirt and other forms of grit become lodged within the base member and are packed up around the screw member, so that during movement of the screw member through the nut, this dirt and grit causes a great amount of wear on the nut and screw member and in fact sometimes prevents operation of the entire construction.

Still further these prior jack constructions, just as any screw and nut arrangement, require constant lubrication between the nut and screw member in order to minimize wear and provide ease of operation. In these prior constructions this lubrication is provided merely by covering the screw member with oil or a light grease during original assembly and after a period of time, unless such lubrication is repeated, insufficient lubrication remains. Thus it becomes increasingly difficult to operate the jack and also this lack of lubrication causes excessive wear.

Finally these prior jack constructions have usually been provided with a pawl and ratchet gear arrangement for turning the nut in the desired direction for either extending or retracting the screw member with reference to the nut, with the pawl being arranged so that it is reversible to provide the proper direction of rotation of the nut as desired. In such an arrangement, a single spring is usually used bearing against a surface of the pawl for maintaining it engaged with the ratchet gear and driving the ratchet gear in the particular direction desired, and this maintaining of the pawl in this position as well as in proper engagement with the ratchet gear has frequently been unsatisfactory because merely point contact is allowed for the spring against the pawl. Furthermore, space requirements do not permit a conventional spring of sufficient strength to be used while still providing the pawl reversible.

It is therefore a general object of the present invention to provide a screw type lifting jack construction which overcomes the difficulties and disadvantages of the prior constructions as pointed out above.

It is a primary object of the present invention to provide a screw type lifting jack construction having an increased extension height while still maintaining a maximum stability and which construction requires a minimum of force for operation thereof.

It is a further object of the present invention to provide a screw type lifting jack construction which is of the multiple screw type, yet due to its inherent construction, provides maximum stability even at fully extended height.

It is still a further object of the present invention to provide a screw type lifting jack construction in which the screws thereof are protected to the maximum extent possible from dirt and other foreign material which can cause failure of operation and rapid wear of the moving parts.

It is an additional object of the present invention to provide a screw type lifting jack construction in which the screws thereof are automatically maintained lubricated at all times.

Also it is an object of the present invention to provide a screw type lifting jack construction in which improved and more positive ratchet means is provided for rotating certain parts thereof to cause extension and retraction of the screws.

Finally it is an object of the present invention to provide a screw type lifting jack construction which satisfies all of the above objects in an efficient manner, yet requires a minimum of manufacturing expense for the production thereof.

These and other objects are accomplished by the parts, constructions, arrangements, combinations and subcombinations comprising the present invention, the nature of which is set forth in the following general statement, a preferred embodiment of which—illustrative of the best mode in which applicant has contemplated applying the principles—is set forth in the following description and illustrated in the acompanying drawings, and which is particularly and distinctly pointed out and set forth in the appended claims forming a part hereof.

In general terms the screw type jack construction comprising the present invention may be stated as including a generally tubular base member having a generally cylindrical cavity formed therein for selective reception telescopically of screw means, preferably in the form of a primary and secondary screw member movable between retracted positions telescoped within the base members and extended positions extending outwardly above the base member. The screw members are externally threaded while the primary screw member, when provided, is also internally threaded, so that the primary screw member is engaged by an internally threaded nut member mounted near the upper end of the base member cavity and extending into this cavity, while the external threads of the secondary screw member are engaged with the internal threads of the primary screw member. In this manner, the primary screw member is extensible from the base member and the secondary screw member is extensible from the primary screw member.

According to the principles of the present invention the nut member is mounted stationary and preferably formed integral with the base member, so that in order to provide extension of the screw members, the primary screw member rotates with reference to the nut member and the secondary screw member rotates with reference to both the primary screw member and nut member. To provide this relative rotation, ratchet means in the form of a pawl and ratchet gear arrangement are mounted at the top end of the secondary screw member and are operable by the usual handle means.

One of the improvements of the present invention, however, is the provision of a C-spring actionable with a relatively wide surface area on the pawl, so that the pawl is properly reversible but yet maintains positive contact with the ratchet gear.

The construction still further includes stop means at the lower ends of each of the primary and secondary screw members for preventing the primary screw member from moving completely outwardly through the nut member and for preventing the secondary screw member from moving completely outwardly through the primary screw member, and a cap member is rotatably mounted at the upper end of the secondary screw member for supporting the load despite the rotation of the screw member. Finally, according to the principles of the present invention, the cavity in the base member is closed, with this cavity being partially filled with some form of lubricating means, such as an oil, below the nut member. Thus, each time the screw members are moved to fully retracted position, a supply of lubrication is provided thereon.

By way of example, an embodiment of the screw type jack construction comprising the present invention is illustrated in the accompanying drawings forming a part hereof, wherein like numerals indicate similar parts throughout the several views, and in which:

FIG. 1 is a side elevation, part in section and partially broken away, showing details of the jack construction and showing the jack construction in fully extended position;

FIG. 2, a side elevation showing the jack construction in fully retracted position;

FIG. 3, a sectional view, part in elevation, looking in the direction of the arrows 3—3 of FIG. 2; and FIG. 4, a bottom plan view of the jack construction of FIG. 2.

The screw type jack construction comprising the present invention includes a base member generally indicated at 10, screw means preferably in the form of a primary screw member 11 and secondary screw member 12, a ratchet assembly generally indicated at 13 and a cap 14. All of the parts are preferably malleable iron or steel stampings or forgings and the various parts are finished in the usual manner as required.

The base member 10 is preferably tubular having the opposed set of reinforcing flanges 15, and the opposed set of reinforcing flanges 16 spaced from the flanges 15 90°, with all of these flanges terminating at the foot member 17. Base member 10 is further provided with a generally cylindrical cavity 18 formed therein and extending vertically thereof, with this cavity opening through the foot member 17 at 19.

According to the principles of the present invention, the opening 19 of cavity 18 through foot member 17 is closed during assembly by a seal member 20 preferably welded in place, as shown, for a purpose to be hereinafter described. Further a nut member 21 is preferably formed integrally with base member 10 at the upper end of cavity 18 and extending into this cavity, with nut member 21 being internally threaded, as shown.

Primary screw member 11 has external threads formed thereon which are engaged with the threads of nut member 21 and a stop member preferably in the form of a weld portion 22 is placed in the primary screw member external threads near the lower end of this screw member for preventing screw member 11 from moving completely upwardly through nut member 21. Primary screw member 11 is also tubular and is provided with a short length of internal threads 23 near the upper end thereof for reception of the secondary screw member 12 therein, with internal threads 23 being engaged with the external threads on secondary screw member 12.

The lower end of the external threads of the secondary screw member 12 are likewise provided with stop means preferably formed with a weld portion 24 to again prevent the secondary screw member 12 from moving outwardly completely through the internal threads 23 of the primary screw member 11. Thus, when the primary and secondary screw members 11 and 12 are fully retracted telescoped within the cavity 18 of base member 10, rotation of the secondary screw member 12 will move this screw member upwardly with reference to the primary screw member 11 and base member 10 until the weld portion 24 engages the internal threads 23, after which, further rotation will rotate both the secondary screw member 12 and the primary screw member 11 with reference to the base member 10 and will move both of these screw members upwardly to extend from base member 10. This movement will continue until the weld portion 22 of the primary screw member 11 engages the internal threads of the nut member 21.

The purpose of the opening 19 through foot member 17 is to make possible the assembly of the primary screw member 11 and secondary screw member 12 with the nut member 21 within the cavity 18 of base member 10, since it is necessary to either first apply the weld portions 22 and 24 to the primary and secondary screw members 11 and 12 first and then assemble these screw members with the base member 10 or to first assemble these screw members with the base member and then apply these weld portions 22 and 24 by the access provided by opening 19 through foot member 17. After this assembly of the screw members 11 and 12 and the formation of the weld portions 22 and 24, according to the principles of the present invention, the cavity 18 is then at least partially filled with a lubricant 25, such as oil, below the nut member 21, and the seal member 20 is assembled to foot member 17 as before described. Thus this seal member 20 will not only keep dirt and other foreign material out of the cavity 18 of base member 10 but will also retain this lubricant 25 in cavity 18.

The ratchet assembly 13 includes an upper plate member 26 and lower plate member 27 both of which extend generally horizontally and enclose the ratchet gear 28, the pawl member 29 and the pawl spring 30 also forming a part of this ratchet assembly. Plate members 26 and 27 are retained together by a series of spaced rivets 31 and these plate members also form the generally rectangular cross-section handle socket 32 and spring seat 33. Further, as is clearly shown in FIG. 3, the handle socket 32 is diametrically opposite the pawl member 29 with reference to the secondary screw member 12 for a purpose to be hereinafter described.

The ratchet gear 28 is received over the upper end of the secondary screw member 12 with this ratchet gear having a flange 34 engaging the flange 35 on the secondary screw member 12, as shown. Further ratchet gear 28 is welded to the secondary screw member 12, preferably by means of the weld 36.

This ratchet gear 28 is provided at its outer periphery with a series of uniformly spaced teeth 37 which are selectively engageable by the driving projections 38 and 39 on the pawl member 29 depending on the particular position of this pawl member. Further plate members 26 and 27 are rotatable with reference to the ratchet gear 28 and pawl member 29 is pivotally retained between these plate members by means of the pivot pin 40 in proper position for the projections 38 and 39 to engage the ratchet gear teeth 37 as will be hereinafter more fully described.

Pawl member 29 is retained in its particular desired pivotal position for engaging either projection 38 or projection 39 with the ratchet gear teeth 37 by means of the pawl spring 30 which is a C-spring having a wide area engageable with a wide area of either the surface 41 on pawl member 29, as shown, or the surface 42 on this pawl member when the pawl member is pivoted around the pivot pin 40. Further the C-shaped pawl spring 30 is retained in its spring seat 33 between the plate members 26 and 27 by means of the spring seat 33 being formed with the recessed portion 43 and the projecting portions 44 and 45, so that the end portions of spring 30 are received in the recessed portion 43 and the spring is confined against lateral movement by the projections 44 and 45 of the spring seat 33.

It is important for the purposes of the present invention that the pawl spring 31 be in a form such as the particular C-spring contour shown so that this spring will have a relatively flat wide surface for engagement with the relatively flat wide surfaces 41 and 42 on the pawl member 29. The fact that the engagement surface of spring 30 is relatively flat and the surfaces on the pawl member 29 are relatively flat insures absolute and positive engagement of the pawl projections 38 and 39 with the ratchet gear teeth 37.

Thus the relatively wide and flat arcuate portion 46 of spring 30 is directed toward and engages one of the relatively wide and flat surfaces 41 or 42 of the pawl member 29. Further, pawl member 29 is provided with the reversing projection 47 separating the surfaces 41 and 42 so that when pawl member 29 is pivoted around the pivot pin 40, reversing projection 47 must compress spring 30 and pass by the arcuate portion 46 thereof.

Finally the pawl member 29 includes the reversing handle 48 projecting therefrom outwardly between the plate members 26 and 27, as shown. Thus handle 48 may be used to pivot the pawl member 29 so that spring member 30 is engaging the surface 41 on the pawl member and forcing the pawl driving projection 38 to engage with the ratchet gear teeth 37 or so that spring 30 is at the opposite side of the pawl member reversing projection 47 engaging the surface 42 and forcing the pawl member driving projection 39 to engage with the ratchet gear teeth 37.

A ball race 49 is preferably formed in the top surface of the ratchet gear 28, as shown in FIG. 1, and further the ratchet gear is provided with a flange 50 engaging the head 51 of a rivet 52, with the shank 53 of this rivet extending upwardly through and above the ratchet gear 28, as shown. The cap 14 is received over the shank 53 of the rivet 52 and is retained thereon by means of the weld 54.

Cap 14 is also provided with a ball race 55 and is supported on the top surface of the ratchet gear 28 by means of a series of balls received in the ball race 55 of cap 14 and the ball race 49 of the ratchet gear 28. Finally the head 51 of the rivet 52 is spaced upwardly from the top end of the secondary screw member 12 so that the entire weight on cap 14 is transmitted through the balls 56 to the ratchet gear 28 and into the secondary screw member 12, while the balls 56 maintain the cap 14 rotatable with respect to this secondary screw member 12.

Cap 14 is preferably provided with the stepped flange members 57, thereby adapting the cap for universally receiving any particular object which is to be lifted by the jack construction such as leaf springs, any axle of a truck or any other portion of the truck which it is required to engage; and any portion which is engaged, due to the unique configuration of members 57, will be securely retained thereon. Further cap 14, ratchet gear 28 and balls 56 may be formed of a heat treated steel and hardened to minimize wear at the ball races 49 and 55 and balls 56 caused by rotation of the secondary screw member 12 and ratchet gear 28 with reference to the cap 14 while a load is retained on this cap.

In operation, when the jack construction is in the position shown in FIG. 2, fully retracted, the primary screw member 11 and secondary screw member 12 are projecting downwardly into the cavity 18 of base member 10 and into the lubricant 25 contained in this cavity, so that these screw members will pick up an amount of this lubrication. For extension of the screw members 11 and 12 a handle (not shown) is inserted in the handle socket 32 with the pawl member 29 being in one of its positions engaging the teeth 37 of the ratchet gear 28.

The ratchet assembly 13 is then rotated, preferably in short strokes, so that rotational movement is transmitted through the pawl member 29 to ratchet gear 28 and into the secondary screw member 12 and so that this secondary screw member moves progressively outwardly toward extended position while the primary screw member 11 remains stationary. As the ratchet assembly 13 is rotated in these short strokes, the driving projection 38 will rotate the ratchet gear 28 when moved in a counterclockwise direction, as viewed in FIG. 3, and this projection 38 will slide over the ratchet gear teeth 37 when moved in a clockwise direction.

As the secondary screw member 12 reaches its fully extended position with reference to the primary screw member 11, the weld portion 24 engages the lowermost of the internal threads 23 on primary screw member 11, after which, continued progressive rotation of the ratchet assembly 13 will cause the rotational motion to be transferred through the secondary screw member 12 into the primary screw member 11 so that this screw member 11 will then move outwardly toward extended position with reference to the base member 10. Again as the primary screw member 11 reaches fully extended height, the weld portion 22 thereof will engage the lowermost of the threads of nut member 21 and at that point be stopped.

As has been described above and clearly shown in the drawings, particularly FIG. 3, the movement for the jack construction between retracted and extended position is gained solely by the force on a handle received in the handle socket 32, with this force being transmitted to the pawl member 29 and into the ratchet gear 28 of the secondary screw member 12. Thus, the particular mounting of the handle socket 32 diametrically opposite from the pawl member 29 and therefore diametrically opposite from the pivot pin 40 of this member distributes this force of operation of the jack construction equally to two sides of the plate members 26 and 27 and two sides of the secondary screw member 12, thereby evening and balancing the wear on the plate members 26 and 27 to indefinitely lengthen the life thereof. This, also, of course, prevents the various working parts of the jack construction, such as the pawl member 29 and ratchet gear 28, from eventually becoming misaligned due to wear of these plate members which could cause failure of the jack construction.

For retraction of the screw members 11 and 12, it is merely necessary to grasp the reversing handle 48 of pawl member 29 and pivot the pawl member around the pivot pin 40 until the pawl spring 30 bears against the pawl member surface 42 and the pawl member projection 39 is engaged with the ratchet gear teeth 37. Thereafter, by continuing the rotational strokes of ratchet assembly 13, the clockwise movements will rotate the ratchet gear 28 and the counterclockwise movements will cause the pawl member projection 39 to slide over the ratchet gear teeth 37.

During this extending and retracting movement of the screw members 11 and 12, the rotational strokes will be positively transmitted from the ratchet assembly 13 to the ratchet gear 28 and ulimately to the secondary screw member 12 due to the fact that the pawl member projections 38 and 39, when the pawl member is in its position engaging one or the other of these projections with the ratchet gear teeth 37, will always be positively engaged with these ratchet gear teeth due to the wide surface contact between the C-shaped pawl spring 30 and the pawl member surfaces 41 and 42. Furthermore, again due to this wide surface contact between pawl spring 30 and pawl member 29, the pawl member is positively prevented from accidentally moving between its positions in which spring 30 is engaged with pawl member surface 41 and in which this spring is engaged with pawl member surface 42.

Still further, when the screw members 11 and 12 are in extended position, as shown in FIG. 1, maximum stability is maintained between these screw members and the base member 10 because of the fact that nut member 21 is solidly positioned in the base member 10 and it is not necessary to rotate the nut member 21 but rather the screw members 11 and 12 are rotated. This arrangement not only allows for workable tolerances between the various parts while still maintaining this stability, but also since the screw members 11 and 12 are rotated at the top of the secondary screw member 12, the jack construction does not tend to "walk" as it is being operated and because of this lack of tendency to "walk" the stability of the construction is further increased.

In addition, even though the screw members 11 and 12 are rotated, the cap 14 supporting the load being lifted remains stationary due to the unique bearing means formed between cap 14 and the secondary screw members 12 by the ball races 49 and 55 and the balls 56. This efficient bearing means between the cap 14 and secondary screw member 12 still further adds to the stability of the jack construction for retaining a load thereon and for lifting and lowering the same.

Finally, due to the particular construction of the base member 10 having the opening 19 at the bottom end of the cavity 18 closed by the seal member 20, by having the lubricant 25 retained at least partially filling the cavity 18 and by having the nut member 21 solidly positioned in the base member 10, this lubricant 25 is properly retained in the base member cavity 18 and cannot leak out of the base member opening 19 nor between the nut member 21 and primary screw member 11, so that constant lubrication is provided for the primary and secondary screw members 11 and 12 and the nut member 21. Every time the jack construction is operated to fully retracted position the screw members 11 and 12 will move into the lubricant 25 and as these screw members are extended an amount of the lubricant will be carried to the nut member 21 and the internal threads 23 of the primary screw member 11 and will thereby be carried to all of the threads of the primary and secondary screw members 11 and 12 when these screw members are again placed in fully retracted position.

Thus, according to the principles of the present invention, a jack construction is provided in which the positive and proper action thereof is always insured and which has a maximum of stability while always being maintained properly lubricated.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art are set forth in the appended claim.

I claim:

Lifting jack construction including a tubular base member having a vertically extending generally cylindrical cavity formed therein, said cavity having a lower end and an upper end, threaded nut means mounted stationary on the base member spaced upwardly from the cavity lower end and extending into the cavity, a hollow cylindrical primary screw member having external threads formed thereon continuously throughout the length thereof and internal threads formed thereon, the external threads of the primary screw member being threadably engaged with the nut means within the cavity, a cylindrical secondary screw member having external threads formed thereon continuously throughout the length thereof, the external threads of the secondary screw member being threadably engaged with the internal threads of the primary screw member, a first weld deposit means between the external threads on the primary screw member engageable with the nut means threads for stopping the primary screw member from moving completely upwardly through the nut means, a second weld deposit means between the threads on the secondary screw member engageable with the primary screw member internal threads for stopping the secondary screw member from moving completely upwardly through the primary screw member, ratchet gear means operably connected to the secondary screw member selectively operable for turning the secondary screw member to move the secondary screw member between retracted and extended positions and for turning the secondary screw member to turn the primary screw member to move the primary screw member between extended and retracted positions when the secondary screw member is fully extended and the second weld deposit has engaged the primary screw member internal threads, a ratchet housing mounted surrounding the ratchet gear means and rotatable with respect to said gear means, pawl means pivotally mounted on the ratchet housing and having spaced projections selectively engageable with the ratchet gear means for selectively driving the gear means in opposite directions of rotation, one pawl means projection being engaged with the ratchet gear means for driving the gear means in one direction of rotation of the ratchet housing and sliding over the ratchet gear means in the opposite direction of rotation of the ratchet housing when the pawl means is selectively pivoted to a first position, the other pawl means projection being engaged with the ratchet gear means for driving the gear means in said opposite direction of rotation of the ratchet housing and sliding over the ratchet gear means in said one direction of rotation of the ratchet housing when the pawl means is selectively pivoted to a second position, the pawl means having two relatively wide flat surfaces formed thereon, leaf spring means mounted on the ratchet housing and having a relatively wide flat leaf spring surface abutting one of the pawl means surfaces for resiliently urging said one pawl means projection to engage the ratchet gear means when the pawl means is in said first position and abutting the other pawl means surface for resiliently urging said other pawl means projection to engage the ratchet gear means when the pawl means is in said second position, and means operably connected with the ratchet housing for rotating said housing.

References Cited in the file of this patent

UNITED STATES PATENTS

| | | |
|---|---|---|
| 839,957 | Reiss | Jan. 1, 1907 |
| 1,933,777 | Traut | Nov. 7, 1933 |
| 2,155,157 | Tyler | Apr. 18, 1939 |
| 2,251,759 | Saunders | Aug. 5, 1941 |
| 2,352,117 | Pasternack | June 20, 1944 |